7/10/84 XR 4,458,802 SR

United States Patent [19]

Maciver et al.

[11] Patent Number: 4,458,802

[45] Date of Patent: Jul. 10, 1984

[54] RENTING OF ARTICLES AND MACHINE THEREOF

[75] Inventors: Kenneth J. A. Maciver; Raoul A. Maciver, both of Johannesburg, South Africa

[73] Assignee: K.J.A. Maciver & Sons (Proprietary) Limited, Johannesburg, South Africa

[21] Appl. No.: 351,556

[22] Filed: Feb. 23, 1982

[30] Foreign Application Priority Data

Mar. 3, 1981 [ZA] South Africa ........................ 81/1403
Nov. 23, 1981 [ZA] South Africa ........................ 81/8119

[51] Int. Cl.³ ............................ G07F 1/06; G06F 7/08

[52] U.S. Cl. .................................... 194/4 R; 194/9 T; 194/DIG. 18; 221/81; 235/381; 186/56

[58] Field of Search ................... 194/2, 4 R, 4 B, 4 C, 194/9 T; 221/69, 76, 79, 81, 87, 91, 2, 4, 7, 8; 235/379, 380, 381, 382, 383, 431; 186/56

[56] References Cited

U.S. PATENT DOCUMENTS

| | | | |
|---|---|---|---|
| 1,809,613 | 6/1931 | Hahling | 52/21 |
| 3,900,092 | 8/1975 | Page et al. | 194/9 T |
| 3,933,231 | 1/1976 | Vinet | 194/1 R |
| 3,978,959 | 9/1976 | Muellner | 194/4 R |
| 4,120,452 | 10/1978 | Kimura | 235/381 |
| 4,141,078 | 2/1979 | Bridges | 364/900 |
| 4,179,064 | 12/1979 | Yoshioka | 235/381 |
| 4,248,334 | 2/1981 | Hanley et al. | 194/4 C |
| 4,300,040 | 11/1981 | Gould et al. | 235/381 |

FOREIGN PATENT DOCUMENTS

| | | |
|---|---|---|
| 2117113 | 7/1972 | France . |
| 2405524 | 5/1979 | France . |
| 353065 | 8/1931 | United Kingdom . |
| 2045989 | 11/1980 | United Kingdom . |

*Primary Examiner*—Joseph J. Rolla
*Assistant Examiner*—Michael S. Huppert
*Attorney, Agent, or Firm*—Karl W. Flocks; Sheridan Neimark

[57] ABSTRACT

A method of renting an article to a patron by the patron presenting a hire token to a renting machine for recognition and energizing of an article selection circuit;

the article selection circuit being energized until stopped by the patron when a desired article registers with a delivery receptacle;

the machine recording a code corresponding to the article and the patron taking delivery of the article; and the machine recording the code of the hire token and holding the hire token captive until released upon return of the article to the machine. The hire token may be held captive until released by the return of the article rented. The machine may be adapted to operate in a cash renting mode to accept payment tokens, or in credit renting mode, when the patron's account is debited and credited. Provision is also made for the payment of a penalty if the predetermined renting period is exceeded.

26 Claims, 36 Drawing Figures

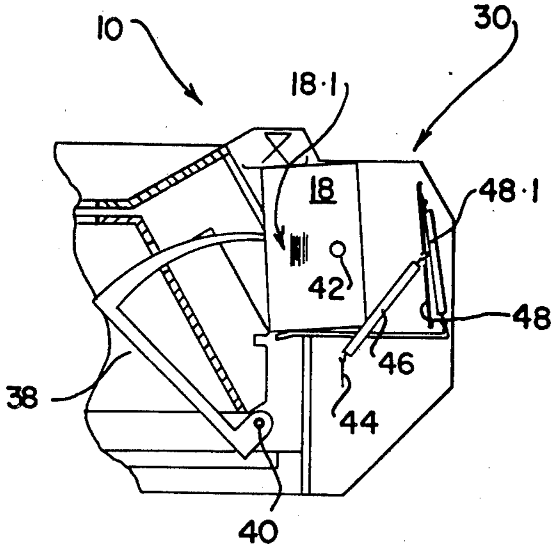
F / G. 3
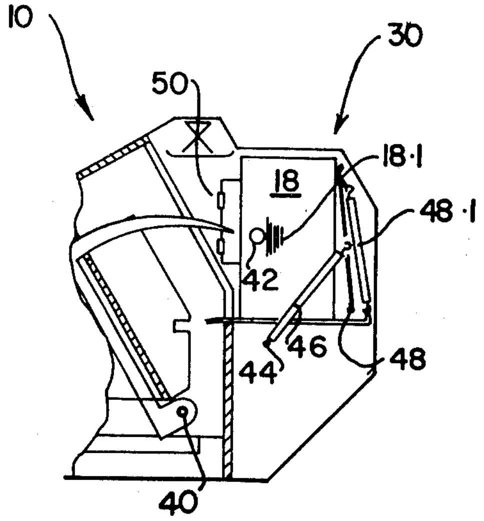
F / G. 4

RENTING OF ARTICLES AND MACHINE THEREOF

This invention relates to the renting of articles. It relates in particular to the renting of articles which may be required for a short time only and which are then returned to the owner of the article. More particularly, the invention relates to a machine for renting articles such as video cassettes, films, and so on.

Accordingly, the invention provides a method of renting articles by means of a renting machine having a store for housing articles in a plurality of compartments, which includes the steps of

- a landlord charging the various compartments of the store of the renting machine with a plurality of articles, each of which is identifiable with its own compartment and its own particular code;
- a patron presenting to the machine a hire token identifiable with the patron, details of the token being automatically recorded by the machine;
- the patron selecting a particular article from the plurality of articles in the store;
- the machine automatically recording details of the code of the article selected by the patron;
- the machine thereupon delivering the article to the patron; and
- the patron, after use of the article, returning it to the machine which, upon recognising the code of the article previously selected by the patron, accepts it into its own particular compartment in the store.

The automatic recording of the token details may be accompanied by the debiting of a predetermined amount to an account which the patron has with the landlord. The acceptance by the machine of a returned article into its own particular compartment, may be accompanied by the crediting of a predetermined amount to the said account.

The hire token may be held captive by the machine until the return of the previously selected article, into its own particular compartment, whereupon the machine then releases the hire token to the patron.

The delivery of the article by the machine to the patron may be prevented until a payment token such as a coin, note, or the like acceptable to the machine has been presented to the machine to cause it to release the selected article to the patron.

The period of renting until the selected article is returned into its own compartment may be measured, and a penalty may be payable if this period exceeds a predetermined period. The penalty may be paid by raising a further debit against the said account. Alternatively, the hire token may be held captive until the penalty has been paid by the patron by presenting a payment token such as a coin, note, or the like to the machine.

The invention extends also to a renting machine adapted for renting articles, such as video cassettes, to a patron holding a coded hire token, the machine including,

- means defining a store having a plurality of compartments and adapted to hold a plurality of articles for rent, each identifiable with its own particular compartment and its own particular code;
- first code-sensing means adapted to sense the code associated with the coded hire token which is identifiable with the patron when a hire token is presented by the patron to the machine;

- first memory means adapted in use to hold details of the said code in memory;
- article-selecting means whereby a patron can select an article for hire;
- second code-sensing means adapted to sense an article code identifiable with the selected article;
- second memory means adapted to hold in memory, details of the code of the selected article;
- article-dispensing means for dispensing the selected article to the patron via a dispensing opening after the article code has been sensed and has been stored in the second memory means and being adapted to bring the particular compartment of the selected article into register with the said dispensing opening; and
- article-accepting means adapted to recognise the code of a previously selected article and to bring the particular compartment of the said previously selected article into register with the dispensing opening, and to permit the said article to pass back into its own particular compartment in the store.

The machine may include accounting means adapted to debit the account of the patron before delivering the article to the patron. The accounting means may be adapted, upon the return by the patron of the previously selected article to the accepting means of the machine, to credit the account of the patron.

The machine may include locking means which in use prevents the article-dispensing means from dispensing the selected article to the patron, until the locking means has been unlocked by being suitably fed with a payment token such as a coin, note, or the like.

The machine may include

- hire token-retaining means which, in use, is adapted to hold the hire token captive; and
- hire token-release means operable to release the hire token from the said retaining means upon acceptance of a returned article by the accepting means.

The machine may also include timing means to measure the period of renting of the article. If such period of renting exceeds a predetermined period, the hire token-release means may require for operation, in addition to return of the article, payment of a penalty by feeding a payment token such as a coin, note, or the like. Alternatively, the penalty may be paid by the accounting means being adapted in use to debit the patron's account by way of paying a penalty if such period of renting exceeds a predetermined period.

The invention extends to a video cassette having a code which is adapted to co-operate with a machine as described, and also to a coded hire token which is adapted to co-operate with the machine.

Embodiments of the invention, adapted for renting video cassettes, will now be described by way of example with reference to the accompanying drawings.

In the drawings,

FIG. 3 shows a part sectional side elevation of a cassette entering a delivery receptacle from a cassette store;

FIG. 4 shows a part sectional side elevation of the cassette fully in the delivery receptacle;

Figure 1:
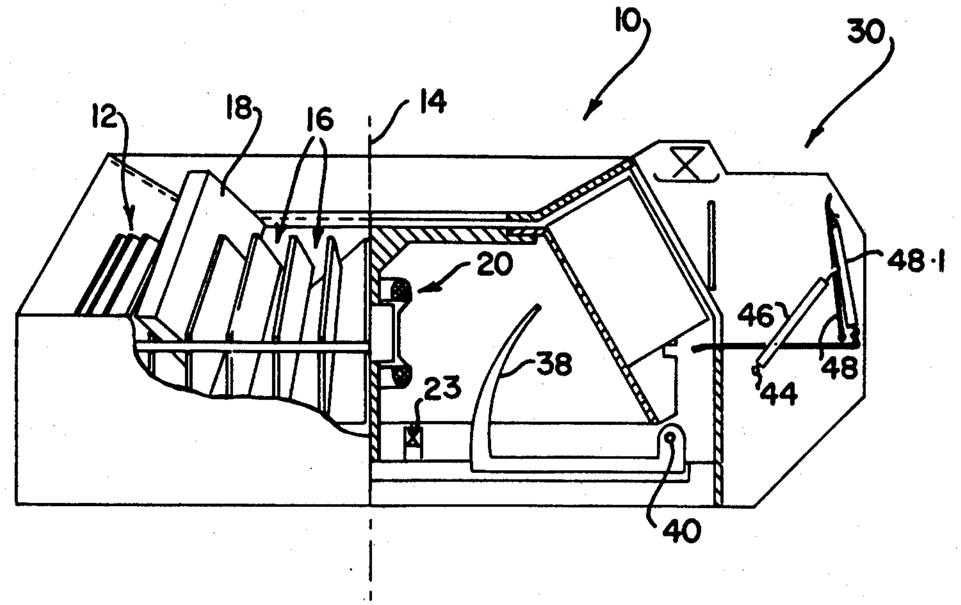
FIG. 1 shows a part axial side elevation at I—I in FIG. 2 of an embodiment of the invention.

Referring to the drawings, reference 10 refers generally to apparatus according to the invention. It comprises a cassette store in the form of a carousel 12, mounted to rotate about a vertical axis 14. The carousel has a number of circumferentially spaced compartments 16 within which a selection of cassettes 18 is housed.

Rotation of the carousel 12, takes place by means of a motor, generally indicated by reference numeral 20, which is energisable from a power source, via a non-latching switch in the form of a push-button switch 22, which in use also energises a catch 23 to release the carousel 12. As soon as the push-button 22 is pressed, the catch 23 releases the carousel, and permits it to rotate. As soon as the push-button 22 is released, the circuit becomes de-energized and the carousel stops, and the catch 23 engages the carousel, thereby locating the carousel in position. The catch 23 is urged into position by a spring, and is released by means of a coil (not shown) energised by closure of the switch 22.

Figure 2:
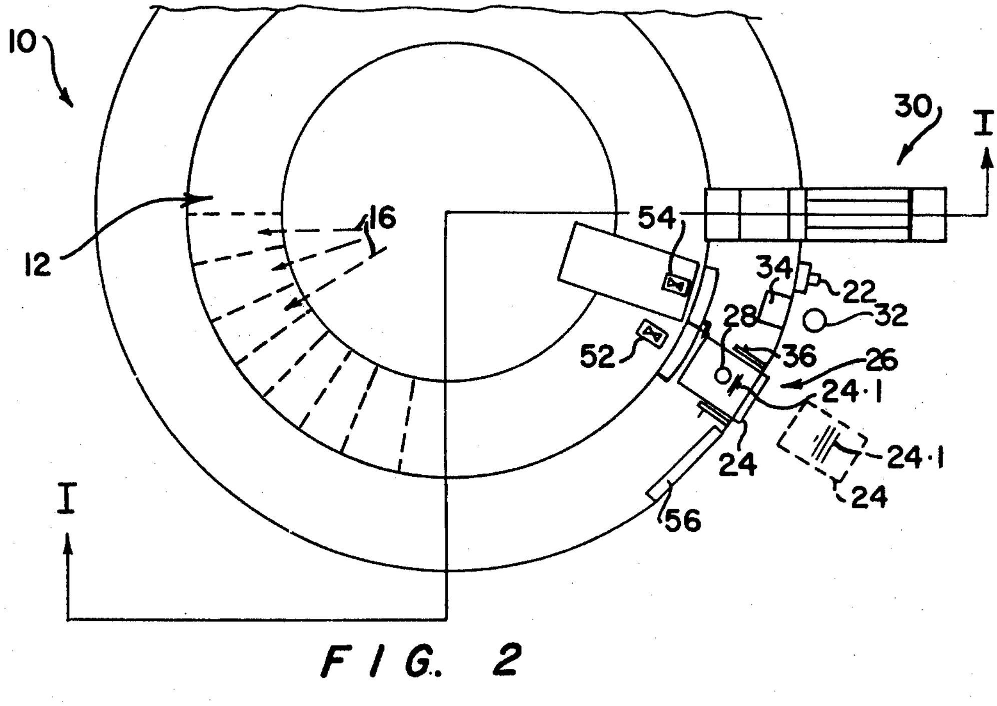
FIG. 2 shows a part plan view corresponding to FIG. 1.
Figure 5:
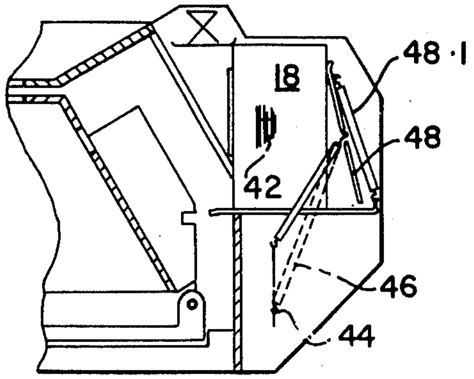
FIG. 5 shows a part sectional side elevation of a cassette being returned, in the delivery receptacle.
Figure 6:
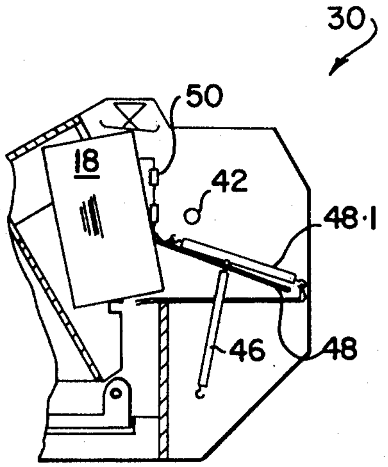
FIG. 6 shows a part sectional side elevation of a cassette being transferred from the delivery receptacle to the cassette store.

Referring now to FIG. 2 of the drawings, a hire token in the form of a card 24, identifiable with a patron and having a code 24.1 on the card, readable by an optical or magnetic sensor of the machine, is inserted into the hire token accepting means, generally indicated by reference numeral 26, of the machine 10. The hire token accepting means, has a sensor 28 adapted to read the code 24.1 of the hire token 24. If the code 24.1 is recognisable by the sensor, then the circuit of which the switch 22 forms a part, will become enabled and will then be in a condition to be energised by closure of the switch 22. The code will be held in memory by the first memory means. If the code 24.1 is not recognised by the sensor 28, then the circuit will not be enabled and pressing of the push button 22 will not energise the circuit.

However, assuming that the circuit has been appropriately enabled the patron then pushes the push-button switch 22 which will release the catch 23 as described above, and will permit the motor to rotate the carousel. The push-button switch 22 is held down until a desired cassette 18 registers with the delivery receptacle 30 whereupon the button 22 is released, resulting in the catch 23 locking the carousel 12 in its position where the desired cassette 18 is in register with the delivery receptacle 30.

A payment token which may be in the form of one or more coins 32, is then inserted into the payment token accepting means 34. Such acceptance of the payment token will start a timing circuit and will energise the hire token retaining means 36 to retain the hire token and to hold it captive in the machine. The movement of the hire token retaining device 36 triggers a limit switch to energise the cassette ejection lever 38 which will cause it to pivot about the axis of a pivot pin 40, as shown in FIGS. 3 and 4 of the drawings. Such pivotal movement of the ejection device 38 pushes the selected cassette 18 into the delivery receptacle 30 of the machine 10.

The cassette, in passing into the delivery receptacle 30, passes a sensor 42 which reads a code 18.1 on the cassette 18. Such code is then held in memory by the second memory means.

If now, after a period, the patron wishes to return the cassette hired by him, he manually replaces the cassette in the delivery receptacle 30 and manually depresses the lower end 44 of a spring 46 whose upper end is connected to a return plate 48 which stands at one end of the delivery receptacle 30. Such depression of the lower end 44 of the spring 46 causes the delivery plate 48 to pivot about an axis at its lower end, and to push the cassette 18 past the sensor 42 which reads the code on the cassette which then compares the code so read with the code held in memory by the second memory means. If the code so read matches with the one previously read and held in the second memory means, the circuit, energisable by the pushbutton 22, is enabled. Depression of the non-latching switch 22 then causes the carousel motor to become energised, and to cause it to rotate until the compartment 16 corresponding to the cassette being returned, registers with the delivery receptacle 30.

When this happens, the circuit becomes de-energised and the catch 23 comes into operation to lock the carousel in that position. The rotation of the carousel takes place until the code stored in the memory of the second recording means, matches the code on the article 18 read by the sensor 42.

In this mode of operation, the circuitry by-passes the switch 22. When the appropriate parts are in register, then the coil for the catch 23 becomes de-energised and the catch 23 locks the carousel in position. At the same time the drive motor of the carousel, is also de-energised.

At this stage of operation, the timing circuitry checks the duration of the period that the cassette 18 has been out of the machine. If the cassette is being returned within the time period allowed, then the circuitry energises a coil to release spring-loaded gate 50 to permit the cassette 18 being returned, to be urged into its compartment 16 in the carousel by means of the return plate 48 acting under the action of spring 46. When the lower end 44 of the spring 46 is released, then the return plate 48 rises again to its upright position (shown in FIGS. 1, 2 and 4 of the drawings), under the action of spring 48.1. At the same time, the circuitry will energise the coil for catch 52, which will release the hire token retaining means 36 and will return the hire token 24 to the patron.

If, however, the cassette 18 is being returned at a time beyond the time limit permitted, then the circuitry will still energise the coil to open the gate 50 to permit the cassette to be returned to its compartment in the carousel. The return plate 48 will be returned to its position as shown in FIGS. 1 and 3 and 4 of the drawings. But a coil is then energised for locking the catch 54, which holds the hire token retention means 36 so as to prevent return of the hire token 24 to the patron. At the same time, a signal 56 is energised, indicating that a penalty is payable. The amount of penalty is also given. Upon presentation of a suitable payment token to the payment token accepting means 34, the coil for operating the catch 54 becomes energised, thereby releasing the hire token retaining means and releasing the hired token to the patron.

If no penalty payment token is presented, then the hire token falls into a receptacle for later identification and handling.

If a foreign cassette is placed in the delivery receptacle 30, and the end 44 of the spring 46 depressed, then the cassette will not be recognised by the sensor 42. This means that the sensor 42 will not recognise the code, and will not find a compatible code in the memory of the machine. Accordingly, gate 50 will not be opened nor will the carousel rotate.

If desired, the machine may also be provided with printing means to provide a permanent record of the articles rented and of the hirers involved. In this way, patrons who have damaged the articles or who have not returned articles, can be traced.

A hire token may be made available to a patron only if a predetermined deposit has been made.

By way of development for privileged patrons, or for those patrons who are prepared to pay a premium on the hire tokens the machine may be modified to dispense with the need for presenting a payment token in order to effect release of an article for hire. In such cases the machine may be arranged merely to receive a hire token and to release an article. The hire token will then be held captive by the machine until released by the return of the article. The machine will then keep a permanent record of details of the patron and of the articles rented by him so that an account can be sent periodically to him.

Figure 7:
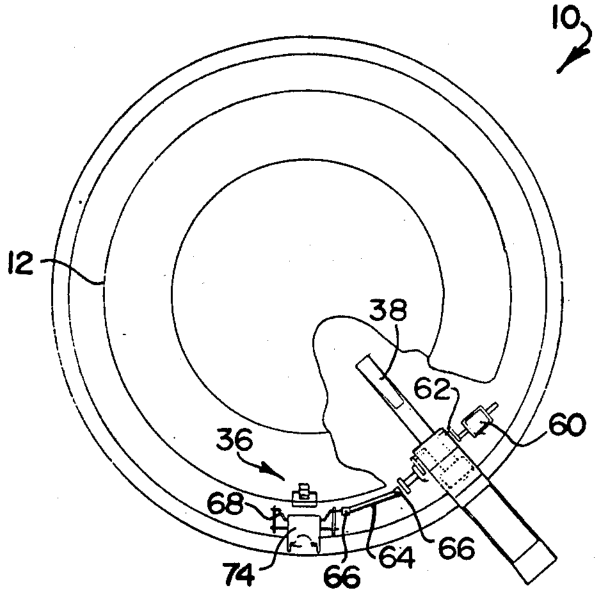
FIG. 7 shows a plan view of a cassette store.

Referring now to FIG. 7, the cassette ejection lever 38 is driven by a motor 60. The motor 60 also drives a crankshaft 62 which in turn drives a drive shaft 64 having universal joints 66 at each end to permit driving of a further crankshaft 68. This allows the hire token retaining means to be driven simultaneously with the lever 38.

Figure 8:
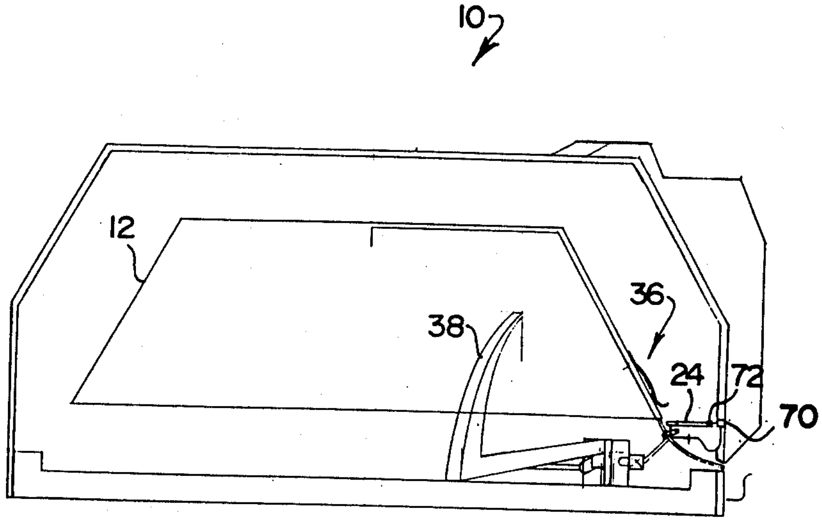
FIGS. 8 to 14 show schematic sectional views of portion of the cassette store of FIG. 7 and illustrates the successive stages of operation of the hire token retaining means.

In FIG. 8, the hire token 24 is shown after it has been inserted in a slot 70 by a patron thereby activating a switch 72 to provide power to the electrical circuitry of the device.

Figure 9:
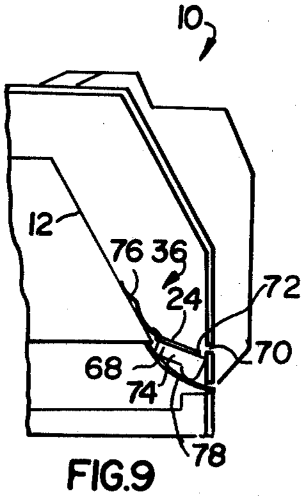

As the crankshaft 68 begins its travel, as shown in FIG. 9, a carrier 74 for the hire token 24 is raised to direct the token 24 towards the correct position associated with the cassette to be released on the carousel 12.

Figure 10:
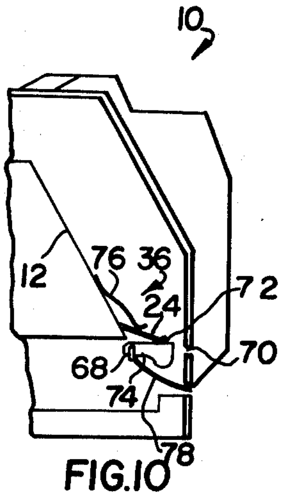

As shown in FIG. 10, upon further movement of the crankshaft 68, the leading end of the token 24 rides up the carousel 12 under a spring clip 76.

Figure 11:
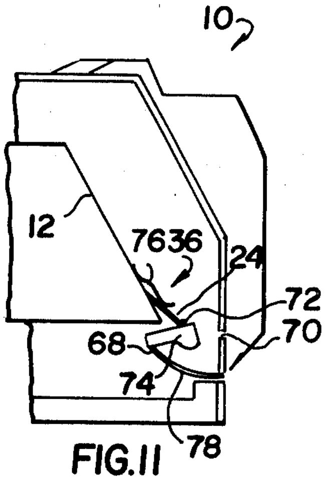
Figure 12:
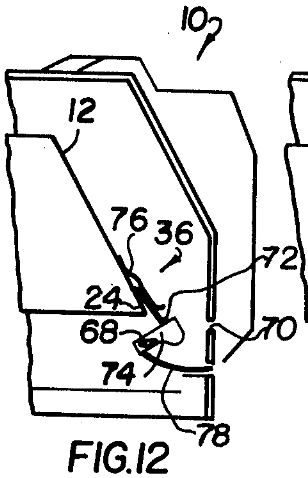

In FIGS. 11 and 12, successive stages of rotation of the crankshaft 68 are shown whereby the token 24 is driven fully home underneath the spring slip 76. In FIGS. 11 and 12, the carrier 74 engages a spring-loaded card return chute 78 thus stabilizes the carrier 74.

Figure 13:
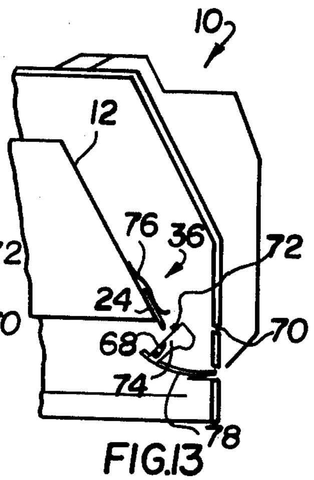
Figure 14:
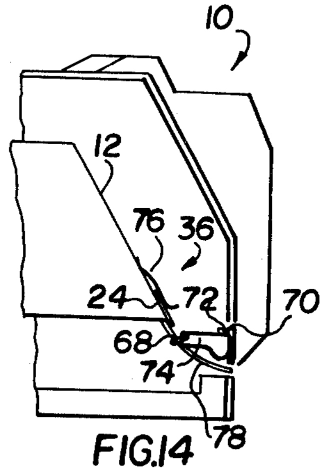

In FIGS. 13 and 14, the carrier 74 is shown being returned to its initial position, and the chute 78 is positioned ready for returning the card when the customer returns the cassette.

Figure 16:
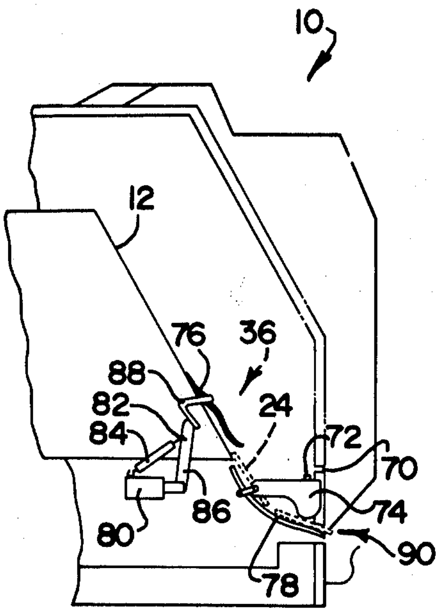
FIGS. 15 and 16 show part-sectional side elevations of the cassette store, and illustrates the successive stages of operation during release of a hire token from the hire token retaining means.
Figure 15:
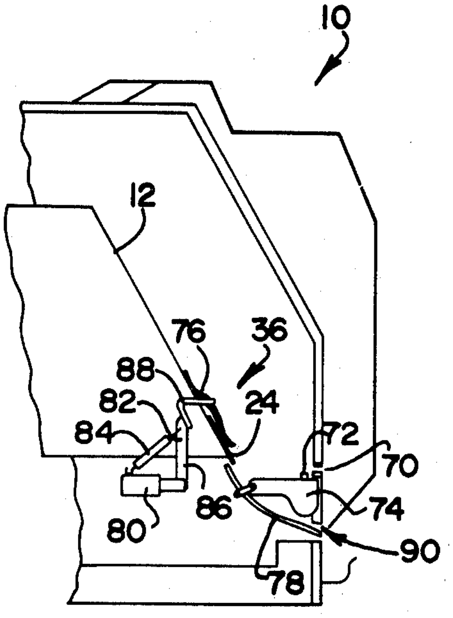

Referring now to FIGS. 15 and 16, the release of the hire token 24 is illustrated, after a customer has returned the cassette. As previously described, when the cassette is returned, the carousel 12 is rotated to position the compartment 16 in a correct position to receive the cassette. This will also automatically result in the appropriate hire token 24 being positioned above the return chute 78. Assuming that the cassette has been returned within the predetermined time limit, a solenoid 80 will be energized, thereby pivoting a lever 82 biassed by a spring 84 about a pivot axis 86. The lever 82 activates a hook member 88 which moves the spring clip 76 to release the token 24 which falls, under gravity, along the chute 78, and out of an aperture 90.

Figure 17:
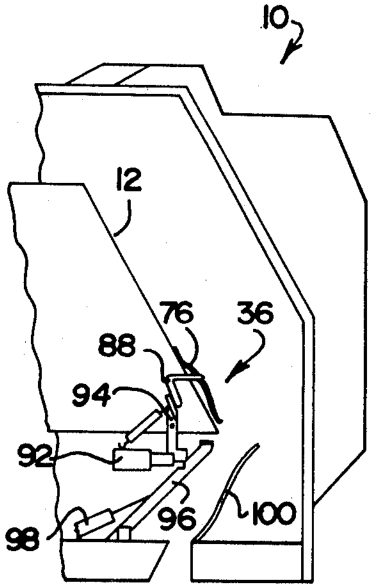
FIGS. 17, 18 and 19 show similar part-sectional side elevations of the cassette store and illustrating the operation of the hire token retaining means when a rented article is returned after a predetermined time limit.
Figure 18:
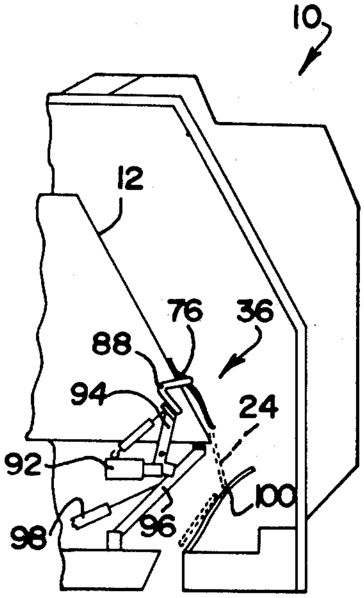

Referring now to FIGS. 17 and 18, the operation of the machine is illustrated when a cassette is returned after the predetermined time limit, thereby requiring the payment of a penalty. If the cassette is returned after the predetermined time limit, and the penalty is paid, the token 24 is returned, as described with reference to FIGS. 15 and 16. If, however, no penalty is paid, a solenoid 92 is energized which latches a latching lever 94 onto a latch member 96. The latching lever 94 is retained in its latched position by a spring 98.

The latching lever 94 and latch member 96 are located ahead of the lever 82 in the direction of rotation of the carousel 12.

Figure 19:
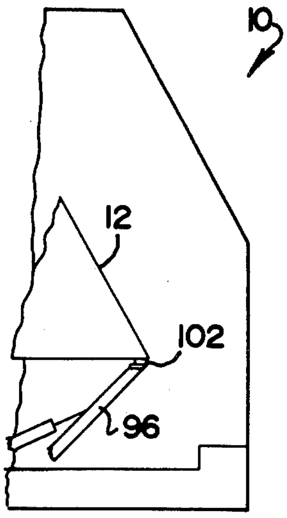

Thus, if no penalty is paid, the token 24 will be retained by the spring clip 76 and will not be returned to the patron. The token 24 will be retained in this position until a next user activates the carousel 12. At that time, rotation of the carousel 12 causes the hook member 88 to ride up a forward portion of the latching lever 94 to release the spring clip 96 and thereby allow the token 24 to fall under gravity onto a token retaining chute 100, and to be retained in the machine. Further rotation of the carousel 12 causes the latching member 96 to engage a cam 102 on the carousel 12, as shown in FIG. 19, thereby to release the latching lever 94 to a neutral position.

Figure 20:
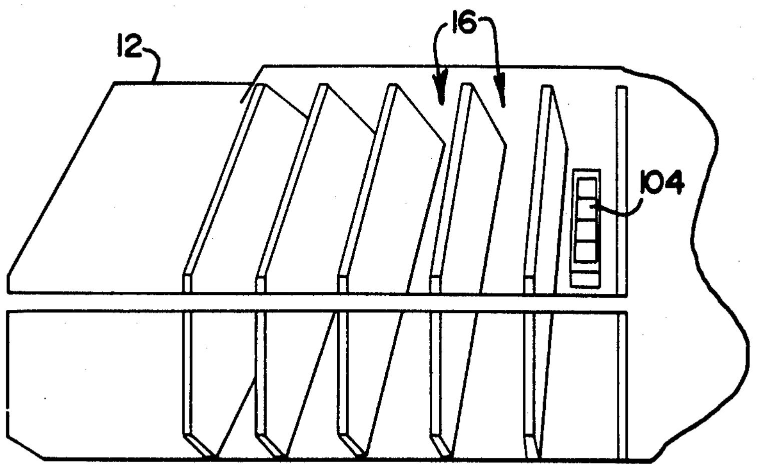
FIG. 20 shows a schematic side elevation of portion of the cassette store, with means for recording the frequency of usage of rented articles.

Referring now to FIG. 20, a modification of the machine is schematically illustrated. In this modification, a counter 104 is provided in each compartment 16 of the carousel 12. Each time a cassette is removed from its compartment, the counter 104 is triggered, thereby providing a permanent record of the number of times a particular cassette is hired. The counter 104 may be arranged to activate an electrical display such as an L.E.D. display so that statistical information can easily be gathered.

Figure 21:
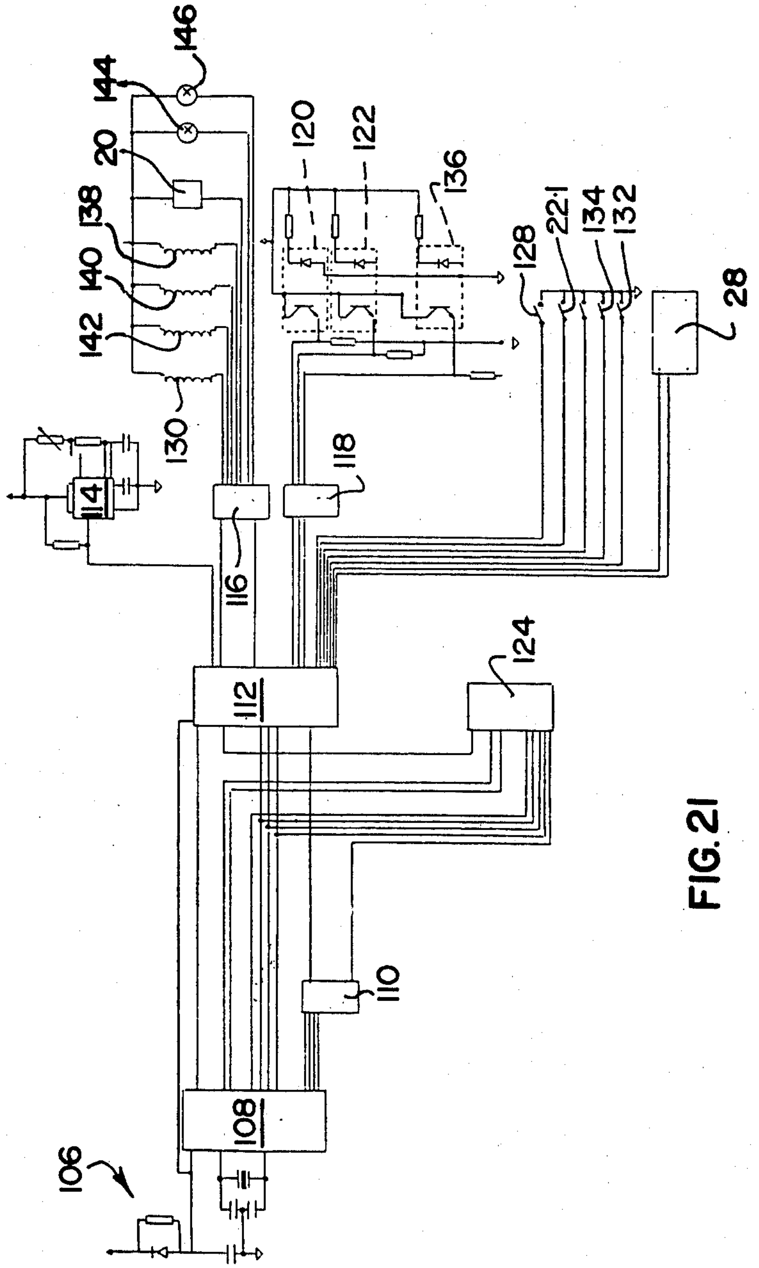
FIG. 21 shows a schematic circuit diagram of electrical and electronic circuitry used in the device.

Referring now to FIG. 21, the control circuitry of the machine is schematically illustrated. The control circuitry is powered from a power source 106 and has various integrated circuits, including a central processing unit 108, an address decoder 110, an input/output interface 112, a timer clock 114, relay and lamp driver 116, an input buffer and photo detector 118, and a first position detector 120 and a second position detector 122. The control circuitry is programmable by an 'EPROM' storage element 124.

In use, the processor 108 continuously checks for the insertion of a hire token into the sensor 28. When the sensor senses the insertion of a hire token, the motor 20 is energized to rotate the carousel. The carousel will be rotated under the control of the position detectors 120 and 122 to an initial start position.

At this time, the patron can depress the button 22 which closes a switch 22.1, again causing energization of the motor 20 to drive the carousel to a selected position. The final rest position of the carousel is determined by position detector 122. When an appropriate payment token is inserted in the coin-receiving device, this is counted by a switch 128, and when the correct amount has been inserted, a relay 130 is energized which energizes the motor 60 of FIG. 7 to pivot the ejection lever 38 to eject the correct cassette from the carousel. At the same time, the timer clock 114 stores the time that the transaction took place. When the motor 60 has completed its cycle, ie when the carrier 74 has been returned to its initial position, as shown in FIG. 14, a switch 132 is closed to inform the control circuitry that that cycle has been completed.

When the cassette is returned by the customer, the return of the cassette will activate a switch 134, and the coding on the cassette is ready by a reader 136. If the correct cassette is returned, the motor 20 is again energized to rotate the carousel to the correct position for the cassette being returned. The position detectors 120 and 122 will advise the control circuitry when the appropriate compartment 16 is aligned with the receptacle 30 of FIG. 1. At this time, a return relay 138 will be energized which then causes the timer to compare the time when the cassette was withdrawn, with the time when the cassette was returned. If this is within a predetermined time limit, a release relay 140 is energized which causes energization of the solenoid 80 of FIGS. 15 and 16 to release the hire token 24.

If, however, the cassette is returned after the predetermined time limmit, the relay 140 will not be energized but instead a retain relay 142 will be energized. The customer must then deposit the correct penalty which again is counted by operation of the switch 128. After depositing the correct penalty, the release relay 140 will be energized to release the token 24.

The control circuitry also includes indicator lamps 144 and 146 to indicate to a patron, at the appropriate time, when he must insert payment tokens or pay penalties.

Figure 22:
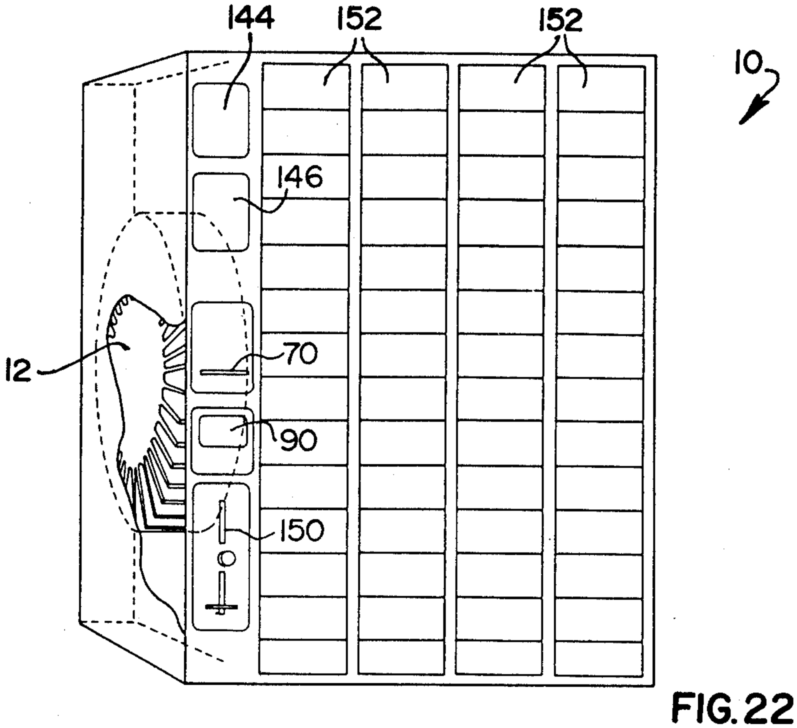
FIG. 22 shows a three-dimensional view of a further form of cassette store.

Referring now to FIG. 22, a modified version of the machine is shown, which permits a number of copies of the same cassette to be hired from a single machine. In this modification, the carousel 12 merely serves to retain the hire tokens and release them at appropriate times.

In the FIG. 22 embodiment, the hire token would be inserted in a slot 70, causing the carousel to hunt for an empty location and then accept the token, record the identification code held on the token, and hold it in memory. A light 144 would then be illuminated to indicate that the customer must pay the hire fee. Payment tokens in the form of coins would then be inserted in a slot 150. When the correct amount has been inserted, the control circuitry then allows the customer to remove a cassette from the bottom of a stack of cassettes contained in columns 152. Again, a code on the cassette is read and recorded in memory by the control circuitry.

In order to return a cassette, it is slid into the top of any one of the columns 152 and again the code is read. The control circuitry rotates the carousel 12 to locate the appropriate hire token in alignment with the delivery chute 90. If the cassette has been returned within the predetermined time limit, the hire token will be returned. Otherwise, if after the predetermined time limit, a penalty lamp 146 will be illuminated, requiring the customer to pay a penalty. Again, if the penalty is not paid, the hire token will not be returned to the customer but will be retained in the machine.

Figure 23:
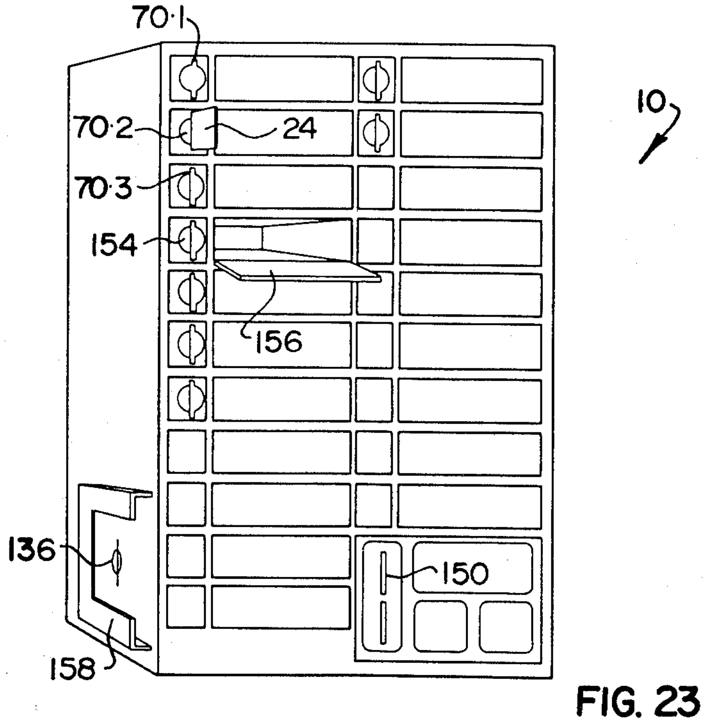
FIG. 23 shows a schematic three-dimensional view of yet a further form of cassette store.

Referring now to FIG. 23, a further form of machine is schematically illustrated. In this embodiment, the hire token 24 is slid into an appropriate slot 70.1, 70.2, etc., and when fully inserted the appropriate slot will be closed by a gate 154. Payment tokens must then be inserted in the slot 150 whereafter a gate 156 can be opened to permit release of the cassette. Again, the code held on the cassette is read and stored in memory by the controlling circuitry and the time of release recorded.

When returning the cassette, it is inserted into a receptacle 158 so that a reader 136 can determine which cassette is being returned. The control circuitry would then open the appropriate gate 156 to permit the cassette to be redeposited. Once the gate 156 is closed, provided the cassette has been returned within the predetermined time, the hire token will be released by opening of the cover 154. If the predetermined time limit is exceeded, a penalty would be payable before the hire token could be released. If the penalty is not paid, the hire token would be retained in the machine.

The invention therefore comprises broadly a method of renting an article to a patron by the patron presenting a hire token to the machine for recognition and energising of an article selection circuit;

the article selection circuit being energised until stopped by the patron when a desired article registers with a delivery receptacle;

the machine recording a code corresponding to the article and the patron taking delivery of the article; and the machine recording the code on the hire token and holding the hire token captive until released upon return of the article.

The method may be modified so that the taking delivery of the article is initiated by the patron presenting a payment token, e.g. a coin, to the machine.

Figure 24:
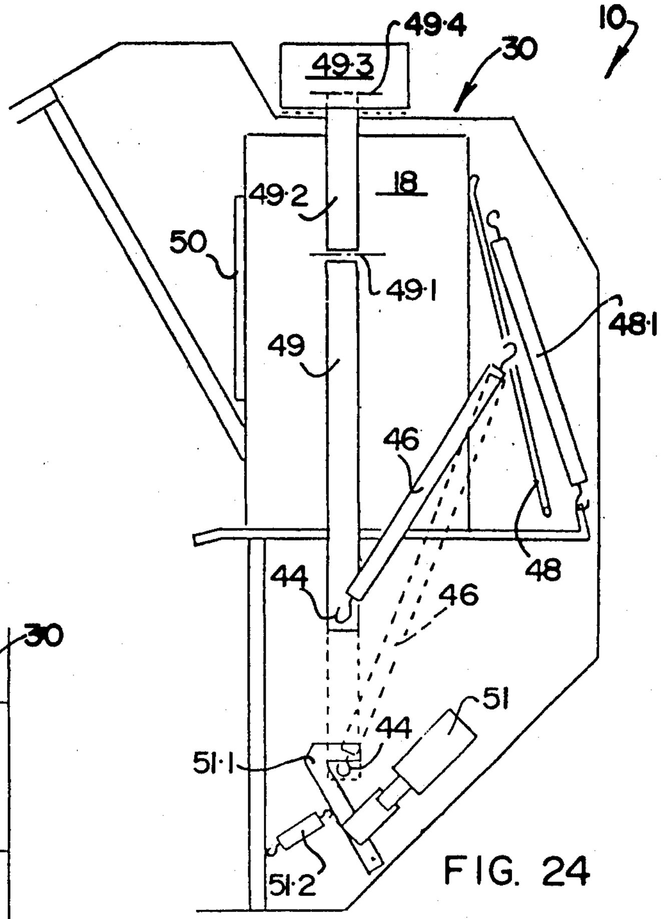
FIG. 24 shows a modification of portion of the cassette store in side elevation similar to FIGS. 3 and 4.
Figure 25:
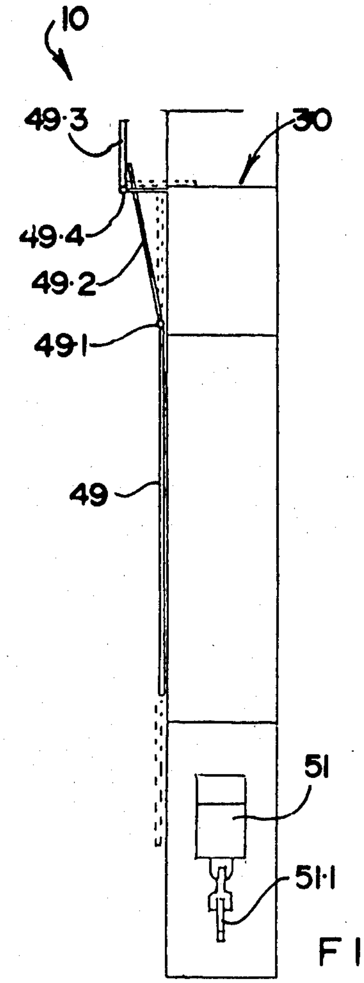
FIG. 25 shows an end elevation of the modification of FIG. 24.

By way of development, a further modification of the machine is shown in FIGS. 24 and 25. FIG. 24 shows a schematic side elevation similar to FIGS. 3 and 4 of portion of the cassette store during return of a cassette and FIG. 25 shows an end elevation of the apparatus illustrated in FIG. 24.

When a cassette is returned and the lower end 44 of the spring 46 is depressed, a lever 49 is simultaneously depressed. The lever 49 has a pivotal connection 49.1 to a link 49.2 which in turn is attached to a gate 49.3. The gate 49.3 is pivoted at 49.4 so that when the lever 49 is depressed, the gate 49.3 closes the mouth of the delivery receptacle 30 preventing the cassette being removed.

As previously described, the delivery plate 48, when the spring 46 is depressed, causes the code on the cassette 18 to be read by a sensor 42 (not shown in FIGS. 24 and 25).

If a valid code is read, the control circuitry will energise a coil 51 thereby activating a latch 51.1, which will hold the return mechanism in tension until the correct location on the carousel is established. At that time and following the activation of gate 50, the coil 51 will be deenergised and latch 51 will be returned to rest by a spring 51.2.

This development prevents a patron removing the cassette from the delivery receptacle prior to its return to the carousel.

Figure 26:
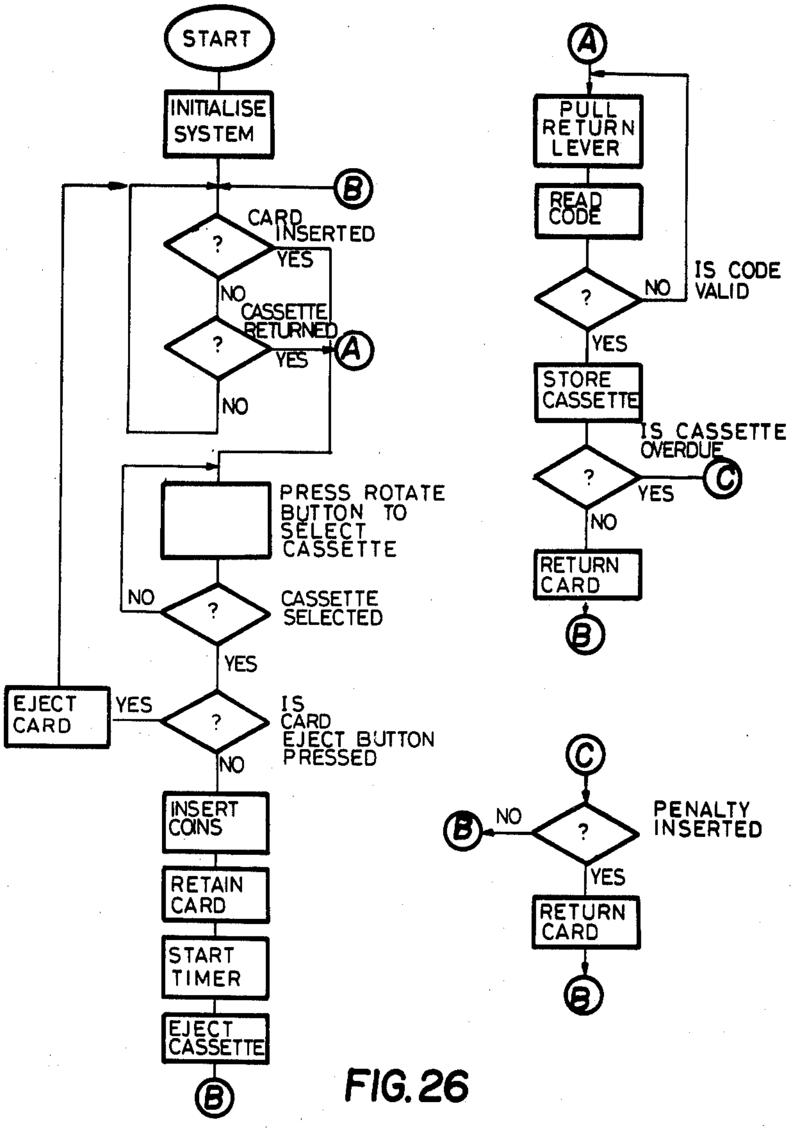
FIG. 26 shows a flow diagram of the sequence of operations of a typical machine according to the invention.

Referring now to FIG. 26 of the drawings there is shown a flow chart representing the various steps involved in operating a machine according to the invention. The drawing shows the steps involved in renting a video cassette from the machine. It also shows the procedure to be followed in returning a video cassette to the machine with or without payment of a penalty. The flow chart is understandable to persons in the art and need not be discussed further.

Figure 27:
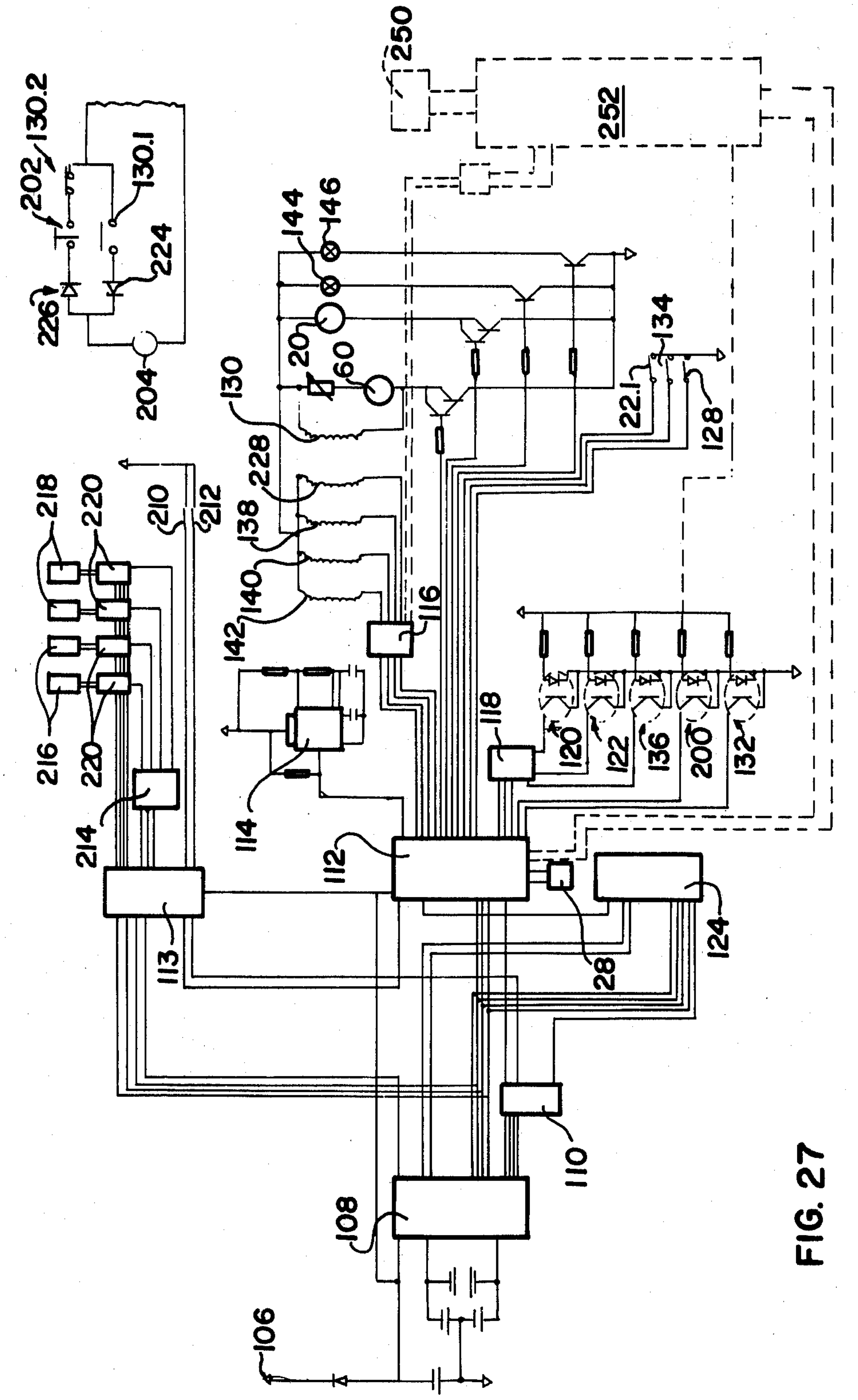
FIG. 27 shows a circuit diagram which is a development of that shown in FIG. 21.

Referring now to FIG. 27, the control circuitry of a modification of the machine of FIG. 23 is schematically illustrated. Like reference numerals refer to like parts. The control circuitry comprises a central processing unit (CPU) 108 which is programmed to control operation of the various elements, by means of a programme stored in the EPROM element 124. The CPU is connected to the EPROM 124 by means of the address decoder 110 which is also connected with input/output (I/O) interface elements 112 and 113. These I/O elements 112 and 113 are also connected with the CPU 108. The control circuitry is supplied with power from a suitable supply.

The I/O element 112 is supplied with inputs from a magnetic card reader 28 and photo detectors 120, 122, 136, 200 and 132. As shown, the photo detectors 120 and 122 are connected to the I/O element 112 via a buffer 118. The detectors 120 and 122 are the first and second position detectors which monitor the starting position of the carousel and the position of the carousel with reference to the cassette eject slot. In operation they cooperate with reflective position marker 123. The detector 136 reads the bar code on the cassette; the detector 200 detects if the magnetic card has been inserted to its fullest extent; and detector 132 detects if the eject arm for ejecting the cassette has returned to its start position.

The CPU 108 is also supplied with inputs from three mechanical switches 22.1, 134 and 128. The switch 22.1 has been described earlier, and is manually operated to cause the carousel to rotate. The switch 134 is activated when a cassette is returned. The switch 128 detects if coins are inserted in the coin receive unit. (Payment token accepting means 34).

The CPU 108 may also be interrogated via two interrogation switches 210 and 212. The purpose of these will be explained below.

The CPU 108 supplies a number of output signals to the following elements:

- a solenoid 142 which retracts pins 142.1 (to be described more fully hereafter) thereby allowing the hire token in the form of a magnetic card 24 to fall into the machine;
- a solenoid 140 which causes pins 140.1 (also described later) to retract allowing the magnetic card to fall out through the chute 143 (also described later) and be returned to the patron;
- a solenoid 138 which operates a replacement mechanism causing the returned cassette to be replaced in its compartment in the carousel;
- a solenoid 228 which displaces a plate to close the receptacle 30 and to energise the replacement mechanism;
- a motor 60 for ejecting a cassette and relay 130;
- the motor 20 for causing the carousel to rotate; and
- two indicator lamps 144 and 146. Lamp 144 indicates when coins are to be inserted, and lamp 146 when a penalty is to be paid.

The solenoids 142, 140 and 138 are supplied from a driver unit 116 whereas the other output elements are supplied from driving transistors.

The control circuitry also includes a clock 114, a decoder 214, a two digit LED display 216, a two digit display 218 and latches 220.

Further there is a motor 204, for ejecting a magnetic card out of the card receive unit or for inserting it into its storage slot in the carousel. The motor 204 is energised from a transformer winding 222. The motor 204 can either be driven in one direction if energised via a diode 224 which is in series with a normally open contact 130.1 operated by the relay 130; or is driven in the opposite direction if energised via an alternative energising route formed by a diode 226 that is connected with opposite polarity to the diode 224, the diode 226 being in series with a normally open push button switch 202 and a normally closed contact 130.2.

The CPU 108 is programmed (by means of the programme stored in the EPROM 124) to operate as described previously. The sequence of operations is indicated schematically in the flow chart shown in FIG. 26.

Thus, the various registers are initialised and the carousel is rotated until the first position sensor 120 detects that the carousel is at its start position. The CPU 108 then continuously checks if a magnetic card (hire token 24) has been inserted into the card receive unit. (hire token accepting means 26) When a card is inserted into the card receive unit 26, this is detected by means of the switch 200. Manual operation of the switch 22.1 is detected causing the motor 20 to be energised, thereby causing the carousel to be rotated. During this phase of the operation, if a patron changes his mind and decides that he does not wish to hire any cassette, he may depress the normally open push button switch 202. This will cause motor 204 to be energised in the correct direction to eject the card from the card receive unit 26.

As indicated previously, the patron depresses the push button 22.1 until the cassette that he desires is in register with the receptacle 30. The extent of rotation of the carousel is monitored by the second position detector 122. Thus, the code of the cassette in register with the receptacle 30, at any time, is monitored and stored by the CPU 108. The appropriate number of coins (payment tokens) 32 is then inserted into the coin receiving device 34 and the number of coins inserted is counted by the switch 128. When the correct amount of money has been inserted the motor 60 and relay 130 are energised. As a result, the relay contact 130.1 is closed thereby energising the motor 204 to drive it in the correct direction to move the magnetic card from the card receive unit 26 into its storage slot in the carousel. The motor 60 rotates the crank 62 which pivots the ejection lever 38 to eject the cassette in register with the receptacle 30 from the carousel into the receptacle. At the same time, the time indicated by the clock 114 is stored.

When the motor 60 has completed its cycle, i.e. when the carrier 74 has been returned to its initial position, as shown in FIG. 14, this is detected by the detector 132 and an appropriate signal supplied to the CPU 108. The carousel is then rotated to its start position, as detected by the first position detector 120.

When the cassette is returned by the patron, the return of the cassette will activate the switch 134. As the cassette is inserted into the receptacle 30 the coding thereon is read by the detector 136. If the correct cassette has been returned, the solenoid 228 is energised, closing the receptacle 30 and energising the replacement mechanism, and the motor 20 is energised to rotate the carousel to the correct position i.e. when the correct compartment in the carousel is in register with the receptacle 30. At this time, the solenoid 138 is energised which causes the cassette to be returned to its correct compartment in the carousel. The time as supplied by the clock is then compared with the time when the cassette was withdrawn. If this is within the predetermined time limit, the release solenoid 140 is energised thereby releasing the card and allowing it to be returned to the customer.

If however, the cassette is returned after the predetermined time limit, the CPU 108 will determine what penalty is to be paid and will energize the indicator lamp 146. If the customer inserts the appropriate number of coins into the coin receive unit, as counted by the switch 128, the solenoid 148 is then energised allowing the card to be returned. Alternatively, if after a predetermined period of time, the appropriate number of coins has not been inserted into the coin receive unit, then the solenoid 142 is energised allowing the card to fall into the machine.

The number of times that a particular cassette has been hired, or if it is overdue for more than 120 hours, may be read from the displays 216 and 218. If the switch 210 is closed, the CPU 108 will display on display 218 the number of times that the cassette in that particular compartment which is in register with the receptacle 30 has been hired. If switch 212 is closed, then an appropriate code will be displayed on display 218 to indicate if the cassette is overdue or not.

Thus far the machine operation for cash mode has been described. However, when the machine is to operate in credit mode, then the hire token need not be retained or held captive. Accordingly the retaining solenoid 142 will not be needed.

Instead, a suitable hire token such as a bank credit card (or the magnetic card 24) is inserted into a card reader 250 which is operatively connected to a credit accounting processor terminal 252 for a computer. If credit is available in the patron's account then a signal is passed from terminal 252 to operate the switch 200 thereby permitting the carousel drive motor 20 to be energised via manually operable switch 22.1. The other parts of the circuitry are completed upon instruction from the accounting processor. Hereafter the sequence of operations is the same as for the case operating mode until delivery of a cassette.

Upon return of a cassette, the card 24 is inserted into the card reader and recorder. Upon return of a cassette the switch 134 is activated and the bar code reader 42, 136 reads the code on the cassette. The solenoid 138 then operates the replacement mechanism causing the returned cassette to be replaced in its compartment in the carousel.

Upon appropriate signals being received from the CPU 108, the solenoids 142 and 140 are energised thereby causing an instruction to be transmitted to the accounting processor to debit the patron's account with rental and penalty. Alternatively, if no penalty is payable then an instruction to debit the patron with rental only will be passed to the accounting processor.

Referring to FIGS. 28 to 31, there is shown a development of the embodiment of the machine already described. This machine is of a similar construction and operates in the same way as described for the earlier embodiment. The main differences are in the drive to the carousel and in the construction and operation of the cassette delivery and return receptacle 30. The carousel 12, is rotatably mounted on bearings 13, to rotate about the axis 14. It is driven, by means of the carousel motor 20, via a reduction gearbox 20.1, and via a friction wheel, 20.2 engaging with a drive track 12.2 of the carousel 12.

The ejection lever 38, is operated by means of an ejection lever crank 62 driven to rotate when in use, by the motor reduction gearbox combination 60. The cassette ejection and receiving unit, is indicated generally by reference numeral 30. The unit has a drawer 30.1, moveable in the direction of arrow 30.2 outwardly and inwardly, for withdrawing a cassette from the device, or for placing it back into the device.

Figure 31:
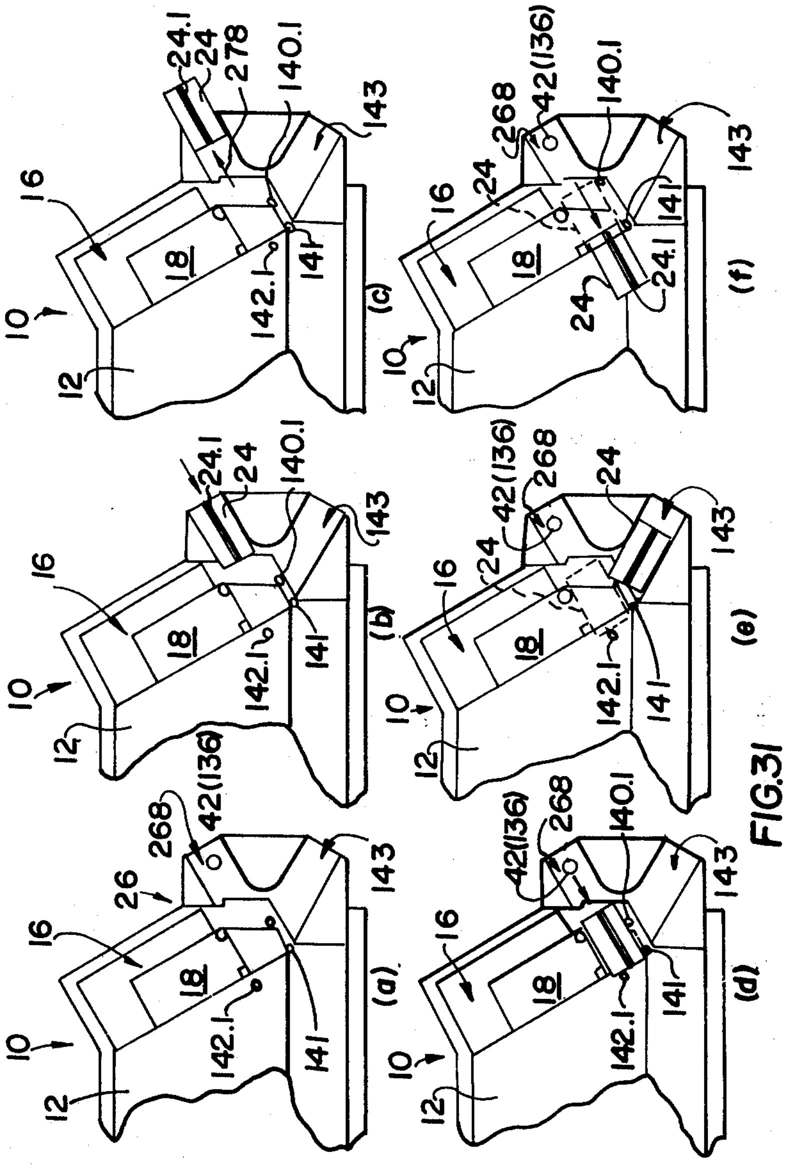
FIG. 31 shows in side view the various stages of cooperation of the hire token receiving means with a hire token.

In use, a hire token in the form of a magnetic card 24, is inserted into the machine. Once it is recognised, then the carousel driving circuit will be enabled. Pressing of the carousel drive button 22.1, will cause the carousel drive motor 20 to be energised and will cause the carousel to rotate about its axis. When the desired cassette registers with the cassette selection template 12.4 on the transparent dome 11 of the machine, then the button 22.1 is released. The carousel will continue rotating, until the selected cassette registers with the cassette delivery receptacle 30. The sensing of this position is done by the position detector 122. In the cash operating mode, the light 144 will then light up, and will illuminate the 'pay rental' sign 55. Thereupon when the appropriate number of payment tokens such as coins, have been presented to the payment token receiving device 34, the cassette eject lever 38 will be appropriately energised, to push the desired cassette into the cassette delivery receptacle 30. At the same time a card drive motor 204 having a card drive friction wheel 262, will drive the magnetic card 24 into a storage compartment in the carousel, corresponding to the compartment from which the selected cassette has been removed. The card 24 will then lie in the position indicated in FIG. 28 of the drawings and also as indicated in FIG. 31(*d*) of the drawings.

In passing into the delivery receptacle the code 18.1 of the cassette, is read by the bar code reader or sensor 42 (136) this information is duly recorded and stored. The drawer 30.1 of the delivery receptacle may then be withdrawn outwardly as indicated by arrow 30.2 and the cassette 18 may be removed. The drawer 30.1 is springloaded and upon removal of the cassette, it closes under its spring bias.

In the credit operating mode, if credit is available to the patron, then instead of the light 144 lighting up, the cassette ejection lever will be energised, and the card drive motor 204 will come into operation, to drive the card into its carousel compartment corresponding to the selected cassette. The patron's account will then be debited an appropriate amount. The machine may be arranged to debit only upon return of the cassette by a patron. In that case recording will be made that that particular cassette has been taken by him.

Figure 28:
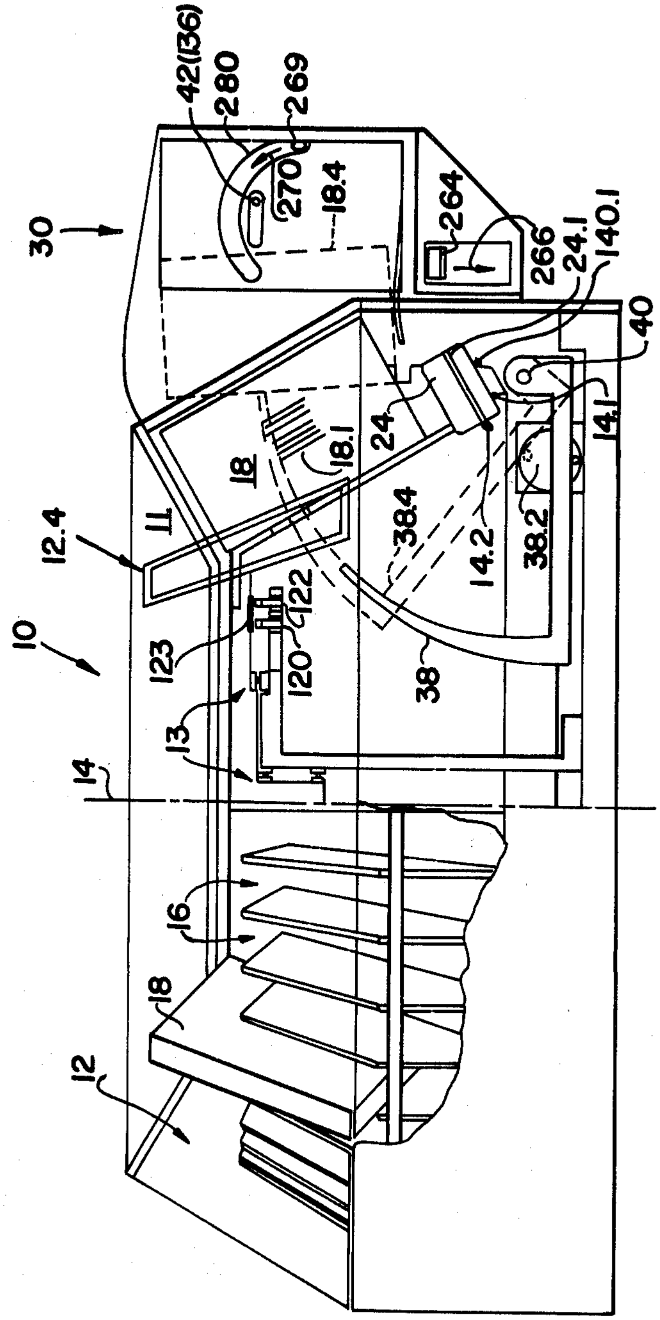
FIG. 28 shows a view similar to FIG. 1 of a development of the embodiment of FIG. 1.
Figure 29:
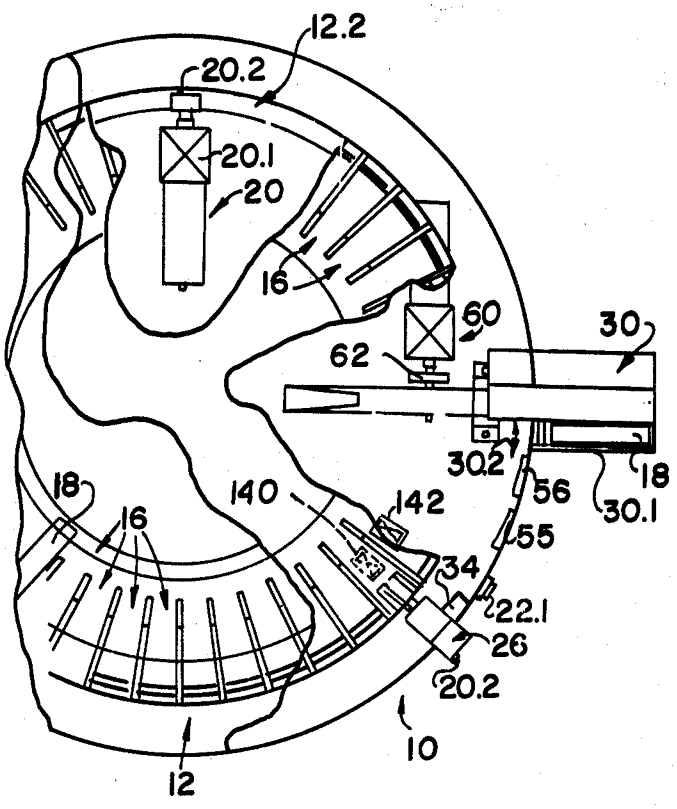
FIG. 29 shows a view similar to FIG. 2 of the embodiment of FIG. 28.

Upon the return of a cassette, the drawer 30.1 of the receptacle 30 is opened, and the cassette is inserted. The bar code 18.1 will be read or sensed by the reader or sensor 42 (136). If the bar code is recognised, then the carousel drive will be energised, and will bring the appropriate compartment 16 of the carousel into register with the cassette delivery receptacle 30. When this happens, then the mechanism cocking lever 264 will be freed which will allow it to be displaced downwardly in the direction of the arrow 266 thereby to cause the cassette return pin 269 to move in the direction of arrow 270 in the path 280, to displace the returned cassette 18, back into its appropriate compartment 16 in the carousel 12. The return pin 268, is provided eccentrically to the rotational axis of a wheel driven via a toothed rack and pinion arrangement, driven from the cocking lever 264. The cassette return pin mechanism is biased on an initial position, as shown in FIG. 28.

In the cash mode operation, if the cassette has been returned within the renting period allowed, then the card return lock 140.1 will be withdrawn and the card 24 will fall into the delivery chute 143 as shown in FIG. 31(*e*) of the drawings and will be delivered by the patron. If however, the permitted renting time has been exceeded, then the card return lock pin 140.1, remains in position, and the penalty lamp 146 is illuminated, to illuminate the sign 56, that a penalty is to be paid. Upon payment of the appropriate penalty, then the card return lock pin 140.1, will be energised by the solenoid 140, and the card as before will fall down the chute 143 for delivery to the patron.

If however, on the other hand, the penalty payable is not paid, within a predetermined period, then the card retain lock pin 142.1 will be withdrawn by the solenoid 142 and the card will fall into the machine and be retained by the machine, as shown in FIG. 31(*f*).

Figure 30:
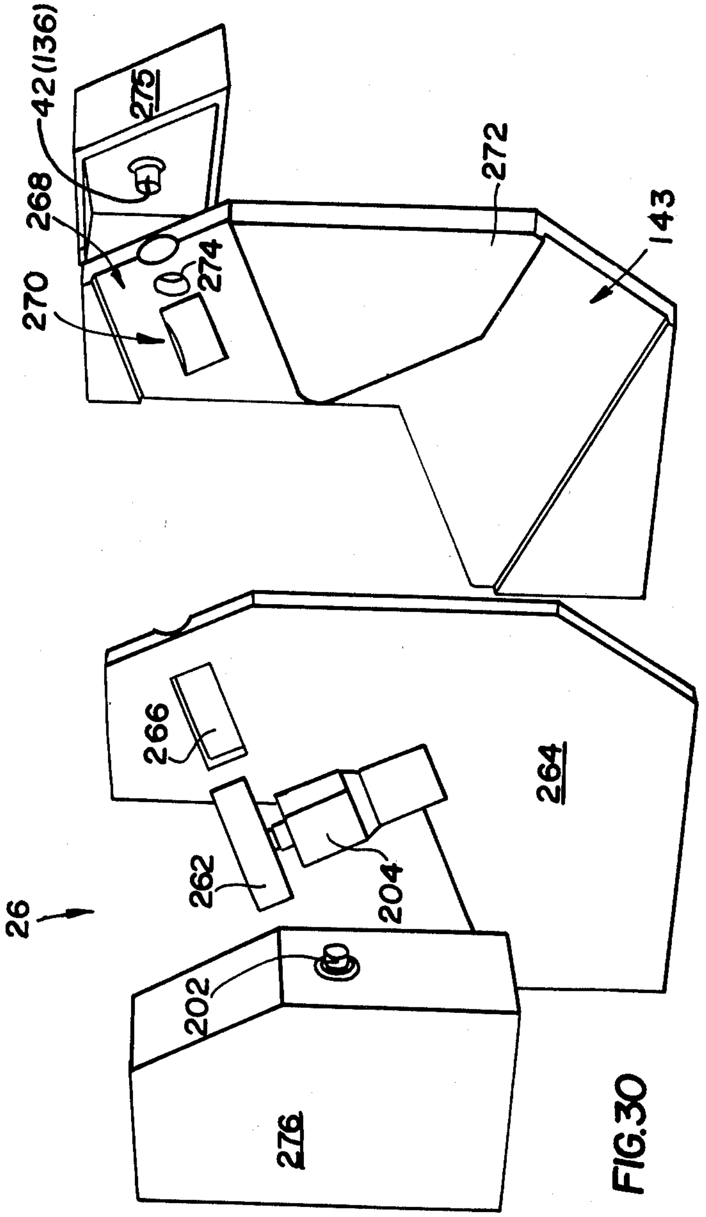
FIG. 30 shows an exploded view of the hire token accepting means of the embodiment of FIG. 28.

Referring now more particularly to FIG. 30 of the drawings, there is shown a detail of the hire token accepting means 26, in exploded form. This description should be read with the description relating to FIG. 28 of the drawings, as well as that with reference to FIG. 31 of the drawings.

The hire token accepting means 26, also referred to as card unit, has a card drive motor 204, with friction drive wheel 262 mounted on the card unit cover 264 having an aperture 266 to permit the friction drive wheel 262 to pass therethrough, into the card entry passage 268. The friction wheel 262 intersects the card entry passage 268, and rotates in use, in the clearance recess 270 provided in the card unit main body 272. An aperture 274 is provided to accommodate a bar code reader or sensor 42 (136) mounted in the code reader cover 275. A card exit passage 143 is defined between the card unit main body 272 and the card unit cover 264. The card unit further includes a motor gearbox cover 276 to fit over the card drive motor and gearbox combination 204 and the friction wheel 262. The motor gearbox cover further has a push button switch 202, also described with reference to FIG. 27 of the drawing, which may be pushed by a patron, if he changes his mind and decides that he does not wish to hire a cassette. This will cause the motor to reverse, and will eject the card in the direction of arrow 278 out of the card entry passage 268 as shown in FIG. 31(*c*) of the drawings. At the inner end of the card entry passage 268, there is provided a card support bar 141 adapted to support the lower end of the card 24, when it is in its innermost position with regard to the entry passage 268, and in a carousel compartment corresponding to the compartment of the selected cassette. At the inner end of the entry passage, there is also provided the card return lock pin 140.1, operable by the solenoid 140, to withdraw it, thereby permitting the card 24 to fall from the dotted position shown in FIG. 31(*e*), into the full line position in that same Figure, into the upper end of the card exit passage 143. However if the card is not to be returned to the patron, then the solenoid 140 will remain unenergised and hence the pin 140.1 will remain in position to prevent the card falling into the upper end of the exit passage 143. Instead, the pin 142.1 will be withdrawn by operation of the solenoid 142 thereby permitting the card to fall out of the carousel compartment into the carousel itself as indicated in FIG. 31(*f*). The card can then be recovered at a later date, and the patron whose card it is can then be appropriately dealt with either by having privileges withdrawn, or by paying fines or the like.

It is an advantage of a machine according to the invention, that articles are available at all times for renting from the machine. Likewise, articles can be returned at any time to be available for further renting. In the cash operating mode, there will be no need for patron client bookkeeping except when the card is retained, when penalties for exceeding the permitted renting period, have not been paid. Cassettes returned to the machine, will be available for rerenting with minimum delay. In the credit operating mode, records will be kept at a central processing station from which accounts can then be sent periodically to selected patrons whose credit is acceptable.

It is contemplated that machines will be placed in a number of different shops or at various other localities where supervision is available, and that the supervisor will then be reimbursed, for his services in supervising the operation of the machine.

In this specification where the context permits, use of the term coin or note is intended to indicate also a payment or value token generally.

We claim:

1. A method of renting articles by means of a renting machine, having a store for housing articles in a plurality of compartments, which includes the steps of a landlord charging the various compartments of the store of the renting machine with a plurality of articles, each of which is identifiable with its own compartment and its own particular code;

a patron presenting to the machine a hire token identifiable with the patron, details of the token being automatically recorded by the machine;

the patron selecting a particular article from the plurality of articles in the store;

the machine automatically recording details of the code of the article selected by the patron;

the machine thereupon delivering the article to the partron; and the patron, after use of the article, returning it to the machine which, upon recognising the code of the article previously selected by the patron, accepts it into its own particular compartment in the store.

2. A method as claimed in claim 1, in which the automatic recording of the token details are accompanied by the debiting of the predetermined amount to an account which the patron has with the landlord; and in which the acceptance by the machine of a returned article into its own particular compartment, is accompanied by the crediting of a predetermined amount to the said account.

3. A method as claimed in claim 1, in which the hire token is held captive by the machine until the return of the previously selected article into its own particular compartment, whereupon the machine then releases the hire token to the patron.

4. A method as claimed in claim 3, in which the period of renting until the selected article is returned into its own compartment is measured, and in which a penalty is payable if this period exceeds a predetermined period; and in which the hire token is held captive until the penalty has been paid.

5. A method as claimed in claim 2, in which the period of renting is measured, and in which a penalty is payable if this period exceeds a predetermined period, and in which the hire token is held captive by the machine until the return of the previously selected article into its own particular compartment, and until the penalty has been paid by the raising of a further debit against the said account whereupon the machine then releases the hire token to the patron.

6. A method as claimed in claim 3, in which the period of renting is measured, and in which a penalty is payable if this period exceeds a predetermined period, and which the holding captive of the hire token continues until the penalty has been paid by the patron by presenting a payment token such as a coin, note, or the like to the machine.

7. A renting machine adapted for renting articles, such as video cassettes, to a patron holding a coded hire token, the machine including, means defining a store having a plurality of compartments and adapted to hold a plurality of articles for rent, each identifiable with its own particular compartment and its own particular code;

first code sensing means adapted to sense the code associated with the coded hire token which is identifiable with the patron when a hire token is presented by the patron to the machine, first memory means adapted in use to hold details of the said code in memory;

article-selecting means whereby a patron can select an article for hire;

second code-sensing means adapted to hold in memory, details of the code of the selected article;

second memory means adapted to hold in memory, details of the code of the selected article;

article-dispensing means for dispensing the selected article to the patron via a dispensing opening after the article code has been sensed and has been stored in the second memory means and being adapted to bring the particular compartment of the selected article into register with the said dispensing opening; and article-accepting means adapted to recognize the code of a previously selected article and to bring the particular compartment of the said previously selected article into register with the dispensing opening and to permit said article to pass back into its own particular compartment in the store.

8. A machine as claimed in claim 7, which includes accounting means adapted to debit the account of the patron before delivering the article to the patron and in which the accounting means is adapted, upon the return by the patron of the previously selected into its own particular compartment, to credit the account of the patron.

9. A machine as claimed in claim 8, in which the accounting means is adapted, upon the return by the patron of the previously selected article to the accepting means of the machine, to credit the account of the patron.

10. A machine as claimed in claim 7, which includes hire token-retaining means which, in use, is adapted to hold the hire token captive; and hire token release means operable to release the hire token from the said retaining means upon acceptance of a previously selected article by the article accepting means into its own compartment in the store.

11. A machine as claimed in claim 10, which includes timing means to measure the period of renting of the article, and in which, if such period of renting exceeds a predetermined period, the hire token release means requires for operation, in addition to return of the article, payment of a penalty by the feeding of a payment token such as a coin, note, or the like to the machine.

12. A machine as claimed in claim 10 which includes timing means to measure the period of renting of the article, and in which the hire token release means requires for operation, in addition to return of the article, debiting by the accounting means of the said account by way of paying a penalty if such period of renting exceeds a predetermined period.

13. A machine as claimed in claim 7, in which the store includes a carousel having a plurality of circumferentially spaced compartments, the carousel being rotatably mounted about an axis, and each compartment being adapted to house an article in such a fashion that it is identifiable by a patron from outside the store, the carousel having driving means for drivingly rotating it about its axis, and the selecting means being operable by the patron when a selected article registers with a selection marking provided.

14. A coded article which is adapted to co-operate with a machine as claimed in claim 7 or claim 13.

15. A coded hire token which is adapted to co-operate with a machine as claimed in claim 7 or claim 13.

16. A method of renting an article to a patron by the patron presenting a hire token to a renting machine for recognition and energising of an article selection circuit;

the article selection circuit being energised until stopped by the patron when a desired article registers with a delivery receptacle;

the machine recording a code corresponding to the desired article and the patron taking delivery of the article; and the machine recording the code of the hire token and holding the hire token captive until released upon return of the article to the machine.

17. A method as claimed in claim 16, in which the delivery of the article is initiated by the patron presenting a payment token to the machine.

18. A method as claimed in claim 16 or claim 17, in which a time period between delivery and return of the article is recorded, and in which if the time period exceeds a predetermined period, the hire token is retained unless a further payment token by way of penalty is presented by the patron to the machine.

19. A method of renting an article to a patron for a hire period, by the patron presenting a hire token to a renting machine for recognition and energising of an article selection circuit;

the article selection circuit being energised until stopped by the patron when a desired article registers with a delivery receptacle;

the machine recording a code corresponding to the desired article and the patron taking delivery of the desired article;

the machine recording the code of the hire token and automatically debiting an account identified by the code of the hire token; and the machine crediting the account with a predetermined account upon the return of the desired article to the machine.

20. A method as claimed in claim 19, in which the hire period between delivery and return of the article is measured.

21. A method as claimed in claim 20, in which a debit by way of paying a penalty is raised against the said account upon the return of the article, if the said hire period exceeds a predetermined period.

22. A method of renting articles by means of a renting machine having a store for housing articles for rent, which includes the steps of a landlord charging the store of the renting machine with a plurality of articles, each of which is identifiable with its own code;

a patron presenting to the machine a hire token identifiable with the patron, details of the token being automatically recorded by the machine;

the patron selecting a particular article from the plurality of articles in the store;

the machine automatically recording details of the code of the article selected by the patron;

the machine thereupon delivering the article to the patron;

the patron, after use of the article, returning it to the machine which, upon recognising the code of the article previously selected by the patron, accepts it into the store;

the machine holding the hire token captive until the return of the selected article, whereupon the machine then releases the hire token to the patron; and measuring the duration of the period of renting, a penalty being payable if this period exceeds a predetermined period, the holding captive of the hire token continuing until the penalty has been paid by the patron by presenting a payment token such as a coin, note, or the like to the machine.

23. A renting machine adapted for renting articles, such as video cassettes, to a patron holding a coded hire token, the machine including means defining a store adapted to hold a plurality of articles;

first code sensing means adapted to sense the code associated with the coded hire token which is identifiable with the patron when a hire token is presented by the patron to the machine;

first memory means adapted in use to hold details of the said code in memory;

article selecting means whereby a patron can select an article for hire;

second code sensing means adapted to sense an article code identifiable with the selected article;

second memory means adapted to hold in memory, details of the code of the selected article;

article dispensing means for dispensing the selected article to the patron after the article code has been sensed and has been stored in the second memory means;

locking means which in use prevents the article dispensing means from dispensing the selected article to the patron, until the locking means has been unlocked by being suitably fed with a payment token such as a coin, note, or the like;

article accepting means adapted to recognise the code of a returned article and to permit the returned article to pass back into the store;

hire token retaining means which, in use, is adapted to hold the hire token captive;

hire token release means operable to release the hire token from the said retaining means upon acceptance of a returned article by the accepting means; and timing means to measure the period of renting of the article, and, if such period of renting exceeds a predetermined period, the hire token release means requiring for operation, in addition to return of the article, payment of a penalty by the feeding of a payment token such as a coin, note, or the like to the machine.

24. A renting machine adapted for renting articles, such as video cassettes, to a patron holding a coded hire token, the machine including means defining a store adapted to hold a plurality of articles, and including a carousel having a plurality of circumferentially spaced compartments, the carousel being rotatably mounted about an axis, and each compartment being adapted to house an article in such a fashion that it is identifiable by a patron, from outside the store, the carousel having driving means for drivingly rotating it about its axis;

first code sensing means adapted to sense the code associated with the coded hire token which is identifiable with the patron when a hire token is presented by the patron to the machine;

first memory means adapted in use to hold details of the said code in memory;

article selecting means whereby a patron can select an article for hire, the said selecting means being operable by the patron when a selected article registers with a selection marking provided;

second code sensing means adapted to sense an article code identifiable with the selected article;

second memory means adapted to hold in memory, details of the code of the selected article;

article dispensing means for dispensing the selected article to the patron after the article code has been sensed and has been stored in the second memory means; and article accepting means adapted to recognise the code of a returned article and to permit the returned article to pass back into the store.

25. A coded article which is adapted to co-operate with a machine as claimed in claim 24.

26. A coded hire token which is adapted to co-operate with a machine as claimed in claim 24.

* * * * *